Feb. 20, 1923.
C. W. SOUDER.
TREATMENT OF ALUMINUM HYDRATE SLUDGE.
FILED OCT. 23, 1919.
1,445,917.
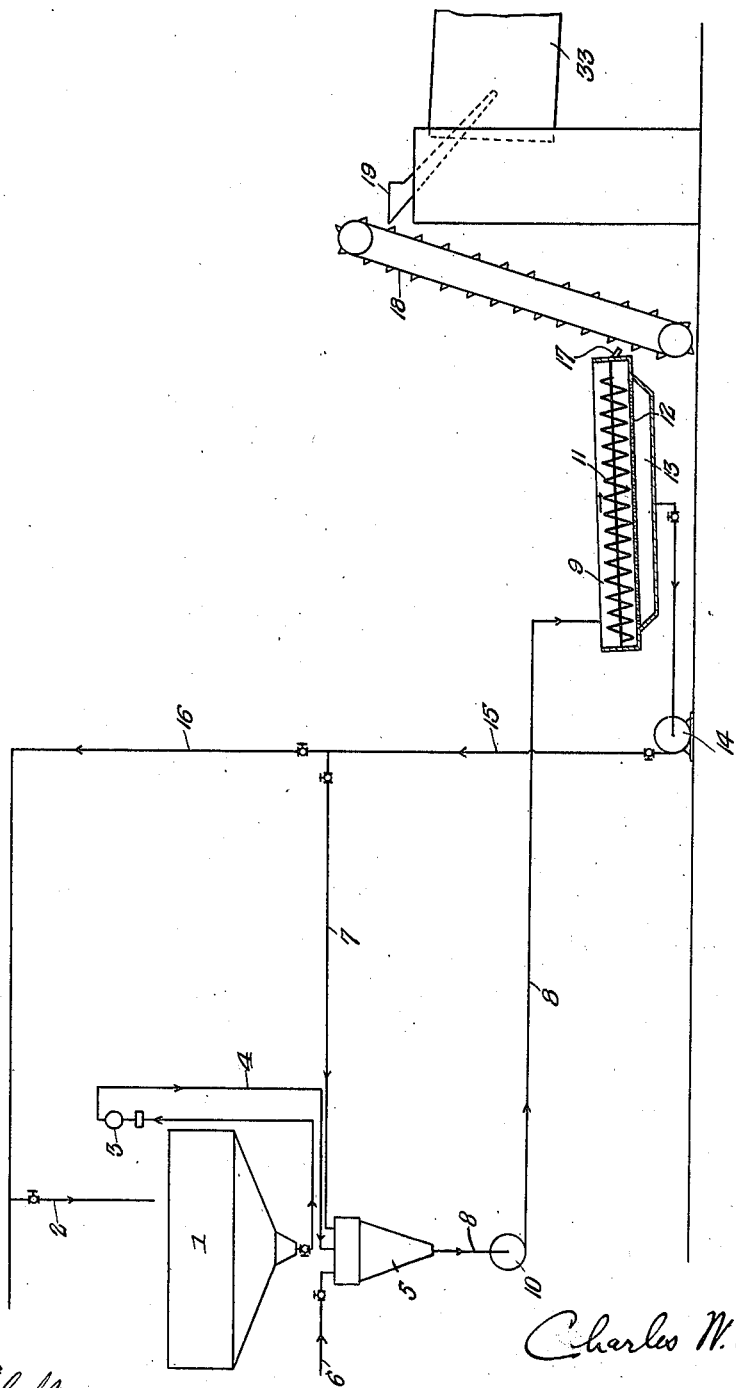

Patented Feb. 20, 1923.

1,445,917

UNITED STATES PATENT OFFICE.

CHARLES W. SOUDER, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

TREATMENT OF ALUMINUM-HYDRATE SLUDGE.

Application filed October 23, 1919. Serial No. 332,825.

*To all whom it may concern:*

Be it known that I, CHARLES W. SOUDER, a citizen of the United States of America, residing at East St. Louis, in the county of St. Clair and State of Illinois, have invented certain new and useful Improvements in the Treatment of Aluminum-Hydrate Sludge, of which the following is a full, clear, and exact description.

The present invention relatest to a process and apparatus particularly designed for the separation of coarse aluminum hydrate from a sludge consisting of the same mixed with an aqueous liquid, which may be a dilute solution containing caustic soda.

In the U. S. patent of R. S. Sherwin No. 1,315,045, dated September 2, 1919, an apparatus is shown in which aluminum hydrate precipitate consisting of coarse and fine particles is carried, while in the form of a suspension, into a separation device in which the coarse precipitate is separated more or less completely from the fine precipitate, after which the coarse precipitate, still in the form of a sludge, is carried through Dorr classifiers or thickeners, in which it is washed with water to remove any fine precipitate still remaining, after which the thickened sludge of coarse precipitate is conveyed away to a calcining apparatus. The present invention is an improvement upon the showing of this patent and involves the more complete removal of water, and of soda, from the final sludge going to the calcining apparatus, so that the material may enter the calcining apparatus in a much drier condition, more completely freed from soda and a more readily regulatable manner, without the necessity of hand feeding of the calcining apparatus. It is to be understood that there are considerable difficulties in the uniform feeding of moist hydrate to the calcining kilns, this being especially the case at times when the wet hydrate has been allowed to accumulate in a stock pile before going to the calcining apparatus. Under such conditions mechanical feeding of the kiln is more satisfactory than hand feeding, and this is particularly the case when new workmen are employed for feeding the kilns.

An apparatus within the scope of the present invention and suitable for carrying out the process embraced within the present invention is shown in the accompanying drawing, the said drawing constituting a side elevation of apparatus suitable for carrying out the process. In said drawing 1 represents the last thickener or equivalent device in which the aluminum hydrate is washed with water or other appropriate aqueous liquid entering from pipe 2. 3 is a diaphragm pump for removing the thickened sudge of coarse hydrate from the bottom of the thickener 1, and for discharging the same through pipe 4 into the hopper-shaped vessel 5, in which it is diluted with water or aqueous liquid supplied in regulatable quantities either from the water line 6 or the liquor line 7. The liquor may flow by gravity through pipe 8 into the filtering device 9, or if desired, a pump 10 may be located at a convenient point in the length of the pipe 8.

The filtering device 9 preferably consists of an inclined elongated vessel. This vessel may be of cylindrical form, and is preferably provided with a screw conveyor 11, or other appropriate means for feeding the solid material, toward the right, namely, toward the outlet end or higher end of the filtering device. The receptacles 9 has a suitable filtering surface located in its bottom as indicated at 12, and below this filtering surface is located a suction box 13, connected with the liquid and air pump (i. e. a "wet vacuum pump") 14 by means of which the liquid separated from the solid material in the filter 9 is pumped away through pipe 15. The liquid from pipe 15 or any desired proportion thereof, may be conveyed through the pipe 7 back into the diluting receptacle 5. Any excess of aqueous liquid may be carried away through pipe 16, either to waste or to some earlier stage of the process, for example, to the pipe 2. Instead of a screw conveyor 11, any suitable device may be employed for pushing along the coarse precipitate, thus a scraping or dragging flight conveyor may be used for this purpose. The level of the liquid supplied by pipe 8 to the filtering device 9 is preferably so adjusted that the last part of the filtering surface 12 (that is to say the portion of this surface toward the right in the figure) is not submerged with liquid, but carries only the wet precipitate which is thereby dried by suction, during its passage over this portion of the surface. The solids from the filtering device are discharged through the chute 17 onto the conveyor 18 and are dumped into the hopper 19 from which they fall by gravity into the upper end of the rotary kiln 33, which kiln is operated in the same manner as the kiln 33 of U. S. patents to Sherwin Numbers 1,314,709 and 1,314,710, for the production of aluminum oxide.

It will be understood that suitable valves are provided in the various pipe lines to control the flow of fluids therethrough. Any air sucked in by the pump 14 will find its exit through the pipe 15 and one or the other of the pipes 7 or 16.

It is advisable to allow considerable air to be sucked through the wet hydrate on filter 12, by the pump 14, to more effectively remove the mechanically held water from the hydrate.

Any suitable conveying means, such as a single screw conveyor, may of course be substituted for the flight conveyor 18 and hopper 19.

I claim:

1. In the process of separating coarse aluminum hydrate from a sludge containing the same in an aqueous liquid, the improvement which comprises diluting the sludge, filtering the diluted sludge, while mechanically moving the said hydrate along the surface of the filter, and sucking the same to a desired condition of dryness; prior to the calcining operation.

2. In the treatment of separated sludge containing coarse particles of aluminum hydrate and substantially free from fine particles thereof, prior to calcination thereof, the steps of diluting said sludge, filtering the diluted sludge by suction and drying the filtered hydrate by suction.

3. In the filtration of aluminum hydrate from a liquid sludge containing the same, before calcining the hydrate, the improvement which comprises filtering aluminum hydrate sludge while mechanically moving the precipitate along to positions out of contact with the liquid portion of the sludge, and sucking the precipitate to a desired condition of dryness during such moving operation.

4. The process which comprises filtering a sludge containing coarse aluminum hydrate substantially free from fine aluminum hydrate by suction, moving along the thickened sludge of aluminum hydrate to positions out of contact with the fluid sludge, and then continuing the suction operation whereby the thickened sludge is brought to a desired condition of dryness.

5. The process which comprises filtering a liquid sludge containing coarse aluminum hydrate relatively free from fine aluminum hydrate by suction, and subjecting the thickened sludge to continued filtration by suction out of contact with the liquid sludge.

In testimony whereof I hereunto affix my signature.

CHARLES W. SOUDER.